United States Patent Office 2,872,358
Patented Feb. 3, 1959

2,872,358

METHOD OF FORMING A BLOCKING LAYER ON A SELENIUM RECTIFIER

Stanley S. Fry, North Chicago, Ill., assignor to Fansteel Metallurgical Corporation, a corporation of New York No Drawing. Application June 4, 1952
Serial No. 291,770

8 Claims. (Cl. 117—200)

This invention relates to a selenium rectifier and method of making the same, and particularly to the blocking layer and method of forming the same.

As is well known, selenium rectifiers consist of a layer of selenium in crystalline form disposed between a carrier electrode and a counterelectrode. Between the selenium and counterelectrode is a thin blocking or dielectric layer which functions to promote the unilateral conductivity of the selenium. In order to reduce the resistance of the rectifier in the forward or conducting direction, it is essential that the blocking layer be as thin as possible. In practice, blocking layers have thicknesses of the order of $10^{-5}$ cm. Because of the extreme thinness of such blocking layers, the variety of materials suitable for use as blocking layers is limited.

Blocking layers may be formed of such materials as lacquer, resin, and other dielectrics. As a rule, an insulating or dielectric material cannot necessarily be used as a blocking layer successfully simply because of its insulation characteristic.

I have found that a selenium rectifier having a blocking layer of an oxygenated titanium compound such as an oxide and/or hydroxide and/or hydrated oxide of titanium has highly desirable properties. By virtue of the new method of forming the blocking layer of the invention herein described, it is possible to have a titanium oxide and/or titanium hydroxide and/or hydrated titanium oxide layer of extreme thinness and uniformity.

Uniformity of blocking layer thickness is of substantial importance. Thus an area having an abnormally thick blocking layer will effectively have a higher forward resistance at that point. The result will be that the efficiency of the rectifier will suffer and there will be a tendency for current conduction to occur along the selenium layer rather than through it. This of course will further aggravate the operating characteristics of the rectifier and may ultimately suffice to result in hot or burned spots in the rectifier.

Titanium oxide, titanium hydroxide and hydrated titanium oxide compounds, alone or in admixture, do not, as such, lend themselves for use in the manufacture of a selenium rectifier. For example, finely divided solid titanium oxide cannot be used since the finest particles would be far too thick for blocking layer dimensions and the lack of uniformity of thickness would be so great that a rectifier would be commercially undesirable. Nor can solutions of the oxide or hydroxide of titanium be used since the known solvents for these materials are unsuitable for use in the manufacture of selenium rectifiers.

In accordance with the present invention the selenium layer is coated with a thin film of a water, alcohol or other suitable solution of a titanium halide which is capable of hydrolyzing to an oxygenated titanium compound such as the oxide, hydrated oxide or hydroxide or a mixture of two or more thereof. The coating is then permitted to hydrolyze, preferably at room temperature, or at an elevated temperature in the order of about 125 to 150° F., and an oxygenated titanium compound or a mixture of such compounds is precipitated in the form of a very thin layer, uniformly distributed over the surface of the selenium.

The solution of the hydrolyzable titanium compound is applied to the selenium when the selenium is in its conducting crystalline form and is ready for the application of a counterelectrode. The titanium compound solution is applied in any desired manner, as by spraying, to obtain the desired thin coating of liquid. After the layer of oxygenated titanium compound has been formed upon the conducting selenium and the layer dried, counterelectrode material may then be applied in any suitable fashion.

The general procedure for the manufacture of a selenium cell, apart from the blocking layer, may be followed. Thus, as is well known, the carrier electrode may be of iron, nickel-plated iron, aluminum, or any other metal suitable for the purpose. Customarily, the carrier electrode has one surface suitably scored or roughened so that a selenium layer will have satisfactory adherence. The layer of selenium on the carrier electrode may be obtained in any one of a number of ways. For example, it is customary to dispose a layer of dry amorphous selenium upon the carrier electrode and then to heat the selenium to a temperature of between 125° C. and 150° C. while pressure is applied to produce a thin uniform layer of selenium. It is also customary to flow molten selenium upon the carrier electrode or condense selenium vapors upon the carrier electrode. The selenium layer initially is in the amorphous, non-conducting form. Thereafter, the carrier electrode and layer of amorphous selenium are heat-treated at temperatures of from about 200° C. up to about 220° C. to convert the selenium into the gray, crystalline, conducting form.

After the heat conversion treatment, the selenium is provided with a blocking layer and a counterelectrode is then applied. The art has customarily called for spraying suitable metal over the blocking layer to provide a counterelectrode. Thus, as an example, Woods metal is widely used for spraying to form a counterelectrode. Other metals, such as cadmium, may also be used. It is, of course, well known that the choice of metals for counterelectrodes is limited by the fact that the counterelectrode metal must cooperate with the selenium for proper action.

As more fully disclosed and claimed in my copending application, Serial No. 291,771, filed on even date herewith, it is also possible to use a solid sheet of counterelectrode metal and apply the blocking layer to the counterelectrode rather than to the selenium. Thereafter, the counterelectrode with the blocking layer is applied over the selenium layer. It is also possible to apply the counterelectrode and blocking layer over the selenium while the selenium is in its amorphous state and continue the heat treatment of the selenium with the selenium layer permanently disposed between its electrodes. This is disclosed and claimed in the aforementioned copending application.

In order to produce the blocking layer, any titanium halide capable of hydrolyzing to an oxygenated titanium compound such as an oxide and/or hydrated oxide and/or an hydroxide of titanium may be used. Thus, titanium chlorides, bromides, iodides and fluorides, alone or in admixture, may be used. I prefer to use the titanium chlorides, $TiCl_3$ and $TiCl_4$. Solutions of any one or a mixture of titanium halides are made and applied to the selenium layer or to the surface of the carrier electrode. The solvent may be water, a lower aliphatic monohydric alcohol such as ethyl, propyl or butyl alcohol, or any other solvent which will not deleteriously affect the selenium. The solution may be applied in any desired manner, such as by spraying, or dipping, or by centrifuging.

Centrifuging involves the spinning of the material upon which the solution is applied so that excess liquid will be thrown off. Thus a disc with carrier electrode and selenium may be rapidly spun while a small quantity of solution is applied at the center.

Centrifuging may be used in cojunction with spraying or after dipping in order to reduce to a minimum the amount of solution remaining upon the surface of the selenium or carrier electrode.

Inasmuch as some solutions of titanium halides tend to hydrolyze rather rapidly, the formation of a thin, uniform layer of hydrolyzed and precipitated material over the selenium surface is not always possible. For production purposes, therefore, it is preferred to include in the solutions of the hydrolyzable titanium compounds, suitable materials which tend to retard hydrolysis. Such materials must be relatively inert to the selenium and other components of the rectifier, and preferably are of a fugitive character, i. e., are driven off during the subsequent manufacture of the rectifier. Thus, to the water or alcohol solutions of the titanium halide or mixture of halides there may be added a small quantity of a mineral acid for stabilizing the solution and retarding hydrolysis. Where a titanium halide is used, such as, for example, titanium chloride ($TiCl_4$), the corresponding halogen acid, such as hydrochloric acid, may be used. Nitric acid is an excellent hydrolysis retardant in accordance with the present invention. In all cases, the amount of acid used is quite small and has no substantial effect upon the rectifier or its manufacture except as the acid retards the hydrolysis of the titanium halide.

In practice, the layer of oxygenated titanium compound is formed in a matter of a few minutes after the application of the hydrolyzable titanium compound solution to the selenium layer, particularly if the ambient atmosphere is humid. It is understood that after hydrolysis, the blocking layer is thoroughly dried.

One example of a titanium solution which has been successfully used is as follows: 94 cc. of ethyl alcohol (commercially pure), 5 cc. of saturated aqueous solution of $TiCl_3$ and 1 cc. of conc. HCl. This solution will keep satisfactorily and hydrolyzes slowly enough so that a very thin layer of solution may be formed. The layer will hydrolyze completely in a moist atmosphere under room temperature within a few minutes. Instead of $TiCl_3$, $TiCl_4$ and the corresponding salts of bromine, iodine and fluorine may be used.

In all cases, the proportions of hydrolyzable titanium compound used are not critical and may be varied widely. The desired speed of hydrolysis is a factor which will permit wide variations in proportions.

I claim:

1. In the manufacture of a selenium rectifier assembly having a layer of selenium between the carrier electrode and counterelectrode with a blocking layer between the selenium and counterelectrode components, the method of forming the blocking layer which comprises applying a solution of a titatium halide which is capable of hydrolyzing to an oxygenated titanium compound of the class consisting of the oxide, hydroxide and hydrated oxide of titanium and mixtures thereof, as a thin film over a surface of one of said components, hydrolyzing, and drying the film.

2. In the manufacture of a selenium rectifier assembly having a layer of selenium between the carrier electrode and counterelectrode with a blocking layer between the selenium and counterelectrode components, the method of forming the blocking layer which comprises applying a solution of a titanium halide which is capable of hydrolyzing to an oxygenated titanium compound of the class consisting of the oxide, hydroxide and hydrated oxide of titanium and mixtures thereof, as a thin film over a surface of the selenium, hydrolyzing and drying the film and then applying the counterelectrode to the assembly.

3. In the manufacture of a selenium rectifier assembly having a layer of selenium between the carrier electrode and counterelectrode with a blocking layer between the selenium and counterelectrode components, the method of forming the blocking layer which comprises applying a solution of a titanium chloride as a thin film over a surface of one of said components, hydrolyzing and drying the film.

4. In the manufacture of a selenium rectifier assembly having a layer of selenium between the carrier electrode and counterelectrode with a blocking layer between the selenium and counterelectrode components, the method of forming the blocking layer which comprises applying a solution of titanium trihalide as a thin film over a surface of the selenium, hydrolyzing and drying the film and then applying the counterelectrode to the assembly.

5. In the manufacture of a selenium rectifier assembly having a layer of selenium between the carrier electrode and counterelectrode with a blocking layer between the selenium and counterelectrode components, the method of forming a blocking layer which comprises applying a solution of titanium tetrahalide as a thin film over a surface of the selenium, hydrolyzing and drying the film and then applying the counterelectrode to the assembly.

6. In the manufacture of a selenium rectifier assembly having a layer of selenium between the carrier electrode and counterelectrode with a blocking layer between the selenium and counterelectrode components, the method of forming a blocking layer which comprises applying a solution of a titanium iodide as a thin film over a surface of the selenium, hydrolyzing and drying the film and then applying the counterelectrode to the assembly.

7. In the manufacture of a selenium rectifier assembly having a layer of selenium between the carrier electrode and counterelectrode with a blocking layer between the selenium and counterelectrode components, the method of forming a blocking layer which comprises applying a solution of a titanium bromide as a thin film over a surface of the selenium, hydrolyzing and drying the film and then applying the counterelectrode to the assembly.

8. In the manufacture of a selenium rectifier assembly having a layer of selenium between the carrier electrode and counterelectrode with a blocking layer between the selenium and counterelectrode components, the method of forming a blocking layer which comprises applying a solution of a titanium fluoride as a thin film over a surface of the selenium, hydrolyzing and drying the film and then applying the counterelectrode to the assembly.

References Cited in the file of this patent

UNITED STATES PATENTS 2,162,613    Emmens et al. _____ June 13, 1939

FOREIGN PATENTS 125,450    Australia _____ Sept. 25, 1947